United States Patent
Moquin (10) Patent No.: US 9,184,791 B2
(45) Date of Patent: Nov. 10, 2015

(54) SELECTIVE ADAPTIVE AUDIO CANCELLATION ALGORITHM CONFIGURATION

(75) Inventor: Philippe Gilbert Jacques Joseph Moquin, Kanata (CA)

(73) Assignee: BlackBerry Limited, Waterloo, Ontario (CA)

( * ) Notice: Subject to any disclaimer, the term of this patent is extended or adjusted under 35 U.S.C. 154(b) by 751 days.

(21) Appl. No.: 13/421,312

(22) Filed: Mar. 15, 2012

(65) Prior Publication Data

US 2013/0243213 A1 Sep. 19, 2013

(51) Int. Cl.
| | |
|---|---|
| *A61F 11/06* | (2006.01) |
| *H04R 1/02* | (2006.01) |
| *H04R 3/00* | (2006.01) |
| *H04B 3/20* | (2006.01) |
| *H04M 1/03* | (2006.01) |
| *H04M 9/08* | (2006.01) |

(52) U.S. Cl.
CPC . *H04B 3/20* (2013.01); *H04M 1/03* (2013.01); *H04M 9/082* (2013.01)

(58) Field of Classification Search
CPC . G10K 11/00; G10K 11/178; G10K 11/1782; G10K 11/1788; G10K 2210/108; G10K 2210/1082; H04B 3/20; H04M 1/03; H04M 9/082
USPC ......... 381/71.1, 71.11, 74, 312, 370, 375, 56, 381/57, 58, 91, 94.1, 95, 102, 104, 122, 123
See application file for complete search history.

(56) References Cited

U.S. PATENT DOCUMENTS

| | | |
|---|---|---|
| 4,718,096 A | 1/1988 | Meisel |
| 6,593,914 B1 | 7/2003 | Nuovo et al. |
| 6,725,057 B1 | 4/2004 | Boyle |
| 7,680,465 B2 | 3/2010 | Zad-Issa |
| 7,728,870 B2 | 6/2010 | Rudnik et al. |
| 7,916,849 B2 | 3/2011 | Bathurst et al. |
| 8,031,853 B2 | 10/2011 | Bathurst et al. |
| 8,090,374 B2 | 1/2012 | Rezvani et al. |
| 2005/0088981 A1 | 4/2005 | Woodruff et al. |
| 2007/0038442 A1 | 2/2007 | Visser et al. |

(Continued)

OTHER PUBLICATIONS

EESR dated Jul. 30, 2012 for EP 12159745.

(Continued)

*Primary Examiner* — Vivian Chin
*Assistant Examiner* — William A Jerez Lora
(74) *Attorney, Agent, or Firm* — Jeffrey N. Giunta; Fleit Gibbons Gutman Bongini & Bianco P. L.

(57) ABSTRACT

Audio processing devices and methods. An ambient microphone picks up ambient sound and a voice microphone picks up a speaker's voice. The voice microphone is located farther from the speaker's mouth when a device is held to one side of the speaker's face than when held to the other side. A signal indicates whether an expected position of the handheld body is a position on a left side or right side of a speaker's face. Ambient sound in the voice signal is reduced by applying a first algorithm configuration selected to process voice signals with lower signal-to-noise ratio when the expected position in on one side of the speaker's face, and by applying a second sound cancellation algorithm configuration selected to process higher signal-to-noise ratios when the expected position is on the other side of the speaker's face.

25 Claims, 5 Drawing Sheets

(56) References Cited

U.S. PATENT DOCUMENTS

| | | | |
|---|---|---|---|
| 2007/0127737 A1* | 6/2007 | Lee .............................. | 381/94.3 |
| 2007/0230712 A1* | 10/2007 | Belt et al. ..................... | 381/71.1 |
| 2008/0112569 A1 | 5/2008 | Asada | |
| 2008/0146289 A1 | 6/2008 | Korneluk et al. | |
| 2008/0159555 A1 | 7/2008 | Asada et al. | |
| 2009/0034752 A1 | 2/2009 | Zhang et al. | |
| 2010/0022283 A1 | 1/2010 | Terlizzi | |
| 2010/0081487 A1* | 4/2010 | Chen et al. ................. | 455/575.1 |
| 2010/0123785 A1 | 5/2010 | Chen et al. | |
| 2010/0172510 A1 | 7/2010 | Juvonen | |
| 2010/0195838 A1 | 8/2010 | Bright | |
| 2010/0217590 A1 | 8/2010 | Nemer et al. | |
| 2011/0142247 A1 | 6/2011 | Fellers et al. | |
| 2011/0293103 A1 | 12/2011 | Park et al. | |
| 2011/0300806 A1 | 12/2011 | Lindahl et al. | |
| 2011/0317041 A1 | 12/2011 | Zurek et al. | |
| 2012/0027219 A1 | 2/2012 | Kale et al. | |

OTHER PUBLICATIONS

Wimmer, R., et al., "HandSense—Discriminating Different Ways of Grasping and Holding a Tangible User Interface," TEI 2009, Feb. 16-18, 2009, Cambridge, UK, Copyright 2009 ACM.

Jeong, J., "Analysis of System Identification and Modified Application to Two-Microphone Speech Enhancement," International Journal of Circuits, Systems and Signal Processing, Issue 2, vol. 3, 2009.

First Examiner's Report dated Oct. 30, 2014 for Canadian patent application No. 2,809,468.

* cited by examiner

SELECTIVE ADAPTIVE AUDIO CANCELLATION ALGORITHM CONFIGURATION

FIELD OF THE DISCLOSURE

The present disclosure generally relates to audio noise and echo cancellation processing and more particularly to selecting audio noise and echo cancellation processing algorithms based on expected operating conditions.

BACKGROUND

Handheld audio devices, such as telephone handsets or other audio pick-up devices, are able to use two or more microphones to perform audio processing such as noise cancellation or echo cancellation upon signals picked up from a main microphone positioned on the device to detect a user's spoken voice. In many handheld audio devices, the main microphone, which is generally referred to below as a "voice microphone," is located close to a central axis on the front of the handheld device to maintain a left-right symmetry for picking up the user's voice. The left-right symmetry provides similar audio pick-up performance with both left-handed and right-handed use. However, the industrial design of some electronic devices places other components on the central axis of the front of the handheld device, and displaces the voice microphone from such a location. In some instances, the voice microphone is asymmetrically located on the front of the handheld device, i.e., away from the central axis of the handheld device. This asymmetrical location of the voice microphone often results in disparate adaptive sound cancellation, such as echo or noise cancellation, performance between use of the handheld device when it is held to a right side or a left side of a speaker's face. Due to the likelihood that a right-handed user is likely to hold a handset on the left side of his or her face, and a left handed user is likely to hold a handset to the right side of his or her face, left-handed and right-handed users tend to experience different levels of echo or noise cancelling performance.

Some designs address this concern by including multiple microphones that are located on different portions of the handset where different subsets of those multiple microphones can be selected as a main voice pick-up microphone while others of those multiple microphones are selected as ambient noise microphones used to support adaptive sound cancellation processing. In those designs, some of those multiple microphones configured or selected to operate as voice pick-up microphones when the handset is held to the right side of a speaker's face, and others of those multiple microphones are configured to operate or are selected to operate as voice pick-up microphones when the handset is held to the left side of the speaker's face. The construction of devices with these multiple microphones increases the costs and circuit complexity of the device due to, for example, the additional microphones and the audio switching and selection processing that must be included.

Therefore, the performance adaptive sound cancellation processing based on ambient sounds detected by an ambient sound microphone that is applied to audio detected by another, asymmetrically placed voice pick-up microphone on a handset is able to be adversely affected based upon which side of the user's face a user is holding the handset.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present disclosure, in which.

DETAILED DESCRIPTION

As required, detailed embodiments are disclosed herein; however, it is to be understood that the disclosed embodiments are merely examples and that the systems and methods described below can be embodied in various forms. Therefore, specific structural and functional details disclosed herein are not to be interpreted as limiting, but merely as a basis for the claims and as a representative basis for teaching one skilled in the art to variously employ the disclosed subject matter in virtually any appropriately detailed structure and function. Further, the terms and phrases used herein are not intended to be limiting, but rather, to provide an understandable description.

The terms "a" or "an", as used herein, are defined as one or more than one. The term plurality, as used herein, is defined as two or more than two. The term another, as used herein, is defined as at least a second or more. The terms "including" and "having," as used herein, are defined as comprising (i.e., open language). The term "coupled," as used herein, is defined as "connected," although not necessarily directly, and not necessarily mechanically. The term "configured to" describes hardware, software or a combination of hardware and software that is adapted to, set up, arranged, built, composed, constructed, designed or that has any combination of these characteristics to carry out a given function. The term "adapted to" describes hardware, software or a combination of hardware and software that is capable of, able to accommodate, to make, or that is suitable to carry out a given function. In the following discussion, "handheld" is used to describe items, such as "handheld devices," that are sized, shaped, designed or otherwise configured to be carried and operated while being held in a human hand.

Described below are systems and methods that perform effective audio improvement processing, on a handheld device, of voice signals picked up by a single voice microphone that is placed asymmetrically on the handheld device. In one example, adaptive sound cancellation based upon ambient sounds detected by a separate ambient sound microphone is performed on audio signals detected by the voice microphone. The below described systems and methods are incorporated on handheld devices that have a voice microphone that is placed asymmetrically relative to a centerline of the handheld device as the device is held to the user's face when the user is speaking into the voice microphone. In the following discussion, a voice microphone describes a microphone configured to pick-up a speaker's voice and produces an electrical signal, referred to as a voice signal, that represents that spoken voice. Handheld devices with an asymmetrically placed microphone are likely to produce voice signals with different voice signal-to-noise ratios based upon whether the handheld device is held to a left side or a right side of a speaker's face. The below described systems and methods use a single voice microphone to pick-up spoken voice sounds regardless of the orientation of the handheld device with respect to the speaker's face. The use of a single voice microphone in the below described systems and methods allows effective audio improvement processing, such as adaptive audio cancellation processing including noise cancellation, echo cancellation, and the like, without the added expense and complexity of including multiple microphones that are each used for voice pick-up under different conditions.

The below described systems and methods perform adaptive audio cancellation processing on the voice signal to reduce or remove ambient sounds, such as noise or echo sounds. Ambient sounds are detected in one example by an ambient sound microphone that is placed on the handheld device at a location that is likely to pick-up ambient sounds but not emphasize picking-up spoken voice energy by a user holding the device to his or her face. Adaptive audio cancellation techniques that are able to be applied to a voice signal are known by practitioners in the relevant art and include a number of possible adaptive processing algorithms where each algorithm is further able to be adjusted by varying values of parameters used by those algorithms. As is generally understood by practitioners in the relevant arts, although these voice signal improvement processes are usually referred to in the art as "cancellation" processes, the processing often only produces an improved voice signal that has a reduced level of ambient sound relative to the ambient sound content of the pre-processed signal. In the following discussion, the term "cancellation" is used as it is normally referred to in the art, and is to be understood to include ambient noise "reduction" or other processing that improves a desired sound signal, such as a voice signal, by reducing the presence of ambient sounds that are picked-up by the voice microphone. Although the following discussion describes processing that reduces ambient sounds from a voice signal, a reference to "reducing" ambient noise also includes removal of ambient noise from a voice signal.

In order to improve the performance of adaptive audio cancellation processing applied to a voice signal that is produced by a voice microphone that is asymmetrically located on a handheld device, the below described systems and methods use an audio processor that accepts an orientation indication that indicates an expected position in which the handheld device is likely to be held. In the following discussion, the expected position is able to be an actual or current position of the handheld device, or the expected position is a position that is based upon a user's input. As used herein, the term "expected position" does not refer to a value or data that is derived by a mental process or subjective concepts, but refers to an algorithmically determined value based upon measured values or user inputs. The expected position in one example is either a left position, which corresponds to the handheld device being held to a left side of a speaker's face, or a right position, which corresponds to the handheld device being held to a right side of the speaker's face. In the following discussion, the term expected position of a handheld device refers to either a position in which a user of the handheld device is likely to hold the device to his or her face, or to the position in which the user is holding the handheld device to his or her face based on positional assumptions. The description of the following examples refers to making selections based upon an expected position of the handheld device relative to a speaker's face. This selection is referred to as being based upon an expected position because the determination of the expected position is based upon information that does not unequivocally indicate the actual orientation of the handheld device relative to the speaker's face. The following examples describe various techniques to determine the expected position of the handheld device.

In one example, an orientation indication is provided by a user through a user interface facility, such as an input screen slider, check box, or the like, that allows a user of the handheld device to indicate if he or she is left handed or right handed. In this example, the expected position is indicated by this orientation indication based upon which side of a person's face a left handed or a right handed person is likely to prefer to hold the handheld device. In an alternative, an orientation indication is able to be a user input that specifies which side of his or her face he or she prefers to hold the handheld device. Based on the received orientation indication, an adaptive audio processor selects or alters one or more adaptive sound cancelling algorithm configurations to more effectively operate with the expected voice signal characteristics, such as different signal-to-noise ratios, that are produced by an asymmetrically located voice microphone when the handheld device is held to one side of the speaker's face or the other. In this example, the orientation indication does not reflect the actual or current orientation of the device.

In further examples, the expected orientation of the handheld device is able to be indicated by an orientation indication that indicates a measured or determined orientation of the handheld device with respect to a horizontal reference, such as the ground. The orientation of the handheld device with respect to the ground is able to be measured or determined by various other techniques, such as accelerometer or gyroscope based orientation sensors that determine the orientation of the handheld device with respect to the ground. In one example, orientation of a device is able to be determined by using a Microelectromechanical System (MEMS) accelerometer based orientation sensor. In those examples, the expected position is indicated by the determined orientation of the handheld device with respect to the ground given an assumption that the user's head is upright. In this example, the orientation indication reflect the current or actual orientation of the handheld device. Based on that orientation and the assumed position of the speaker's head, the expected position of the handheld device is indicated as being one of held to the left side or held to the right side of a speaker's face. An expected position based upon a present orientation as determined by an orientation sensor may not accurately reflect which side of the speaker's face the handheld device is being held since, for example, the user may by lying down.

The expected orientation of the handheld device is able to be detected in further examples by other techniques. In one example, a likely orientation of the handheld device is able to be determined by light sensors that are placed at various locations around the body of the handheld device. For example, a first set of one or more light sensors is able to be placed at locations on the body of the handheld device such that a hand, the person's ear or other areas of the persons head or body is likely to be covering those light sensors when the handheld device is held on one side of the person's head. Additionally, a second set of light sensors is able to be placed at locations that are not likely to be covered when the handheld device is held to that side of the person's head. The locations of the first set and, if present, the second set of light sensors are selected so as to also be in locations where the first set of light sensors is not likely to be covered when held to the other side of the person's head, while the second set of light sensors are likely to be covered when the handheld device is held on the other side of the person's head. A processor is able to determine which light sensors are exposed to light, and which light sensors are not exposed to light, and an orientation indication is able to be provided based on those determinations.

As described below, two characteristics that are affected by the side of the speaker's face to which the handheld device is held is the voice signal-to-noise ratio present in the voice signal produced by a voice microphone, and the level of the speaker's voice that may be present in the ambient sound signal produced by the ambient sound microphone. The placement of microphones is generally chosen to maximize voice sound pick-up by the voice microphone and lessen the voice pick-up by the ambient sound microphone. This placement is generally chosen based on an assumption that the user is right-handed, and therefore likely to hold the handheld device to the left side of his or her face. When the handheld device is held to the right side of the speaker's face, the voice signal-to-noise ratio is likely to be reduced, and in some designs the voice energy picked-up by the ambient sound microphone is likely to increase over the voice signal picked-up by the ambient sound microphone when the device is held to the left side of the speaker's face.

The below described adaptive sound cancellation processing is able to use various adaptive sound cancellation processing algorithms that are each able to have different parameter values to control their operation. In the below discussion, an adaptive sound cancellation processing algorithm configuration refers to a combination of the particular adaptive sound cancellation processing algorithm and the specific parameter values used to control the operation of the that algorithm. The adaptive sound cancellation processing algorithm configurations used by the below described systems and methods are able to accommodate the changes in voice signals and ambient sound signals by various techniques. For example, different adaptive sound cancellation algorithms are able to be selected based upon whether the expected position in which the handheld device is held is to the left side or the right side of the speaker's face. Further, the same adaptive sound cancellation algorithm is able to be used but different parameters are able to be set for that algorithm based upon whether the expected position of the handheld device is to the left side or the right side of the speaker's face.

In general, the below described systems and methods select algorithms, parameters, or both, for adaptive sound cancellation processing to accommodate lower voice signal-to-noise ratios in voice signals that are produced when the handheld device is held to a right side of a speaker's face relative to when it is held to the left side of the speaker's face. In some examples, the below described systems and methods select algorithms, parameters, or both, for the adaptive sound cancellation processing to also accommodate a higher level of the speaker's voice in the detected ambient sound signal when the expected position is a right side of a speaker's face relative to when the expected position is to the left side of the speaker's face.

The following discussion describes a handheld device with microphones placed at locations that are selected to operate more effectively when the handheld device is held to the left side of a user's face. It is clear that the below described systems and methods are able to be applied to other devices with other microphone locations, such as handheld devices with microphone placements that operate more effectively when the handheld device is held to the right side of the user's face. Further, the below described systems and methods are able to be applied to non-handheld devices to accommodate expected locations of persons speaking into the device.

Various differences are possible between adaptive sound cancellation algorithm configurations that are selected based upon which side of speaker's face the handheld device is likely to be held. One example of differences based upon a side of the speaker's face on which the handheld device is likely to be held includes performing ambient sound cancellation or reduction such that the amount of ambient sound reduction is different based upon which side of speaker's face the handheld device is likely to be held. In one example, noise cancellation or reduction processing using a spectral subtraction algorithm is able to select different amounts of noise reduction when it is expected that the handheld device is held on the left side and the right side of the speaker's face. In one example, when high voice signal-to-noise ratios are expected, such as when the expected location of the handheld device is on the left side of a speaker's face, an adaptive sound cancellation algorithm configuration is selected that uses a spectral subtraction algorithm with 20 dB of noise reduction. When a low voice signal-to-noise ratios is expected, such as when the expected position of the handheld device is on the right side of a speaker's face, an adaptive sound cancellation algorithm configuration is selected that uses a spectral subtraction algorithm with 10 dB of noise reduction. Another example includes selecting to use an adaptive noise cancellation algorithm that uses a dynamic noise model when high voice signal-to-noise ratios are expected, such as when the expected position of the handheld device is on the left side of a speaker's face, and a static model is used when low voice signal-to-noise ratios are expected, such as when the expected position of the handheld device is on the right side of a speaker's face. Additional differences between adaptive sound cancellation algorithm configurations that are selected based upon the side of a speaker's face on which the handheld device is expected to be held include, for example, changes in frequency dependent factors in the algorithm and changes in a beta factor of some noise reduction algorithms.

Figure 1:
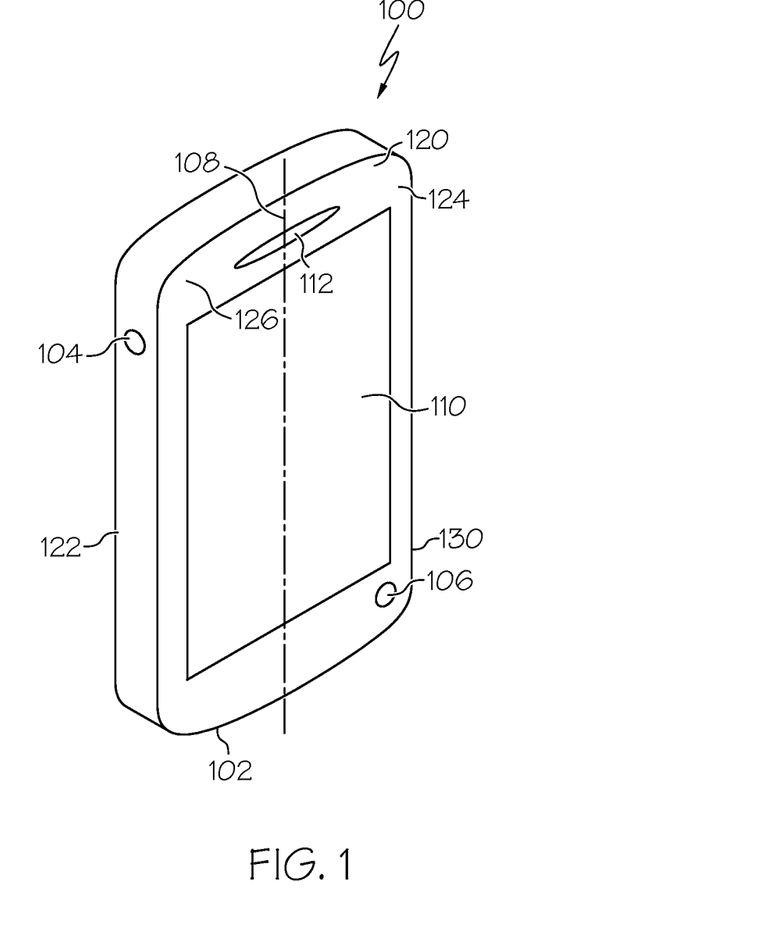
FIG. 1 illustrates a handheld audio device, according to an example.

FIG. 1 illustrates a handheld audio device 100, according to an example. The handheld audio device 100 is an example of a portable electronic device that is able to include an audio processor as is described below. The handheld audio device 100 in this example is a wireless voice and data communication device such as a smartphone. Further examples of a handheld device that is able to include an audio processor as is described below include cellular telephone handsets, telephone handsets, other audio pick-up devices, and the like.

The handheld audio device 100 includes a handheld body 102 that provides mounting locations and that serves as an enclosure for various components. Illustrated as mounted on outside locations of the handheld body 102 are an earpiece speaker 112, a display screen 110, a voice microphone 106 and an ambient sound microphone 104. Further electronic components are mounted within the handheld body 102 to provide functions whereby the handheld audio device 100 is able to operate as a wireless voice and data communications device and perform other audio and data processing functions.

The illustrated handheld body 102 depicts a view of an aspect of the handheld device 100 that shows a front 120 and a left side 122 of the handheld device 100. A centerline 108 is depicted on the front 120 so as to bisect the front into a right half 124 and a left half 126. In the following discussion, the centerline 108 is referred to as extending in a vertical direction, and a direction extending across the front 120 and that is perpendicular to the centerline is referred to as a horizontal direction. It is to be understood that the handheld device 100 is able to be held in any orientation and that references to a vertical direction or a horizontal direction are to facilitate the description of various aspects of the illustrated example and are not to be understood as limiting in any way.

In the illustrated example, the display screen 110 occupies most of the area of the front 120 such that little area remains for externally mounting components on the front 120 of the handheld device 100. The earpiece speaker 112 is shown in this example to be located in a horizontally central position at the vertical top of the handheld body 102. The voice microphone 106, however, is positioned on the right half 124 at a location that is near a right horizontal edge 130 of the handheld body 102.

In various modes of operation, the handheld device 100 is used when a user of the device is speaking and the user can be considered to be a speaker whose voice is to be detected by the voice microphone 106. As described in further detail below, the location of the voice microphone 106 near the right horizontal edge 130 causes the voice microphone to be expected to be located at a farther distance from a speaker's mouth when the handheld body 102 is held to a right side of a speaker's face than when the handheld body 102 is held to the left side of a speaker's face. In other words, when the handheld body 102 is held to the right side of the speaker's face, the voice microphone is expected to be located closer to the speaker's mouth than when the handheld body 102 is held to the left side of the speaker's face.

The voice microphone 106 is located on the front 120 of the handheld body 102 and detects a speaker's voice when the handheld body 102 is held near the speaker's face. The voice microphone produces a voice signal that represents the detected speaker's voice. The voice microphone will also, however, detect ambient sounds, such as noise and echoes, and those additional ambient sounds will also be represented in the voice signal produced by the voice microphone. In general, it is desirable to reduce or remove ambient sounds other than the speaker's voice that are present in the voice signal produced by the voice microphone 106.

The illustrated handheld device 100 depicts an ambient sound microphone 104 that is mounted on an upper part of the left side 122 of the handheld body 102. The mounting of the ambient sound microphone 104 in the upper part of the left side 122 places the ambient sound microphone 104 near the earpiece speaker 112 and near the speaker's ear. The ambient sound microphone 104 detects ambient sounds and produces an ambient sound signal that is used by various functions performed by an audio processor, which is described in further detail below, located within the handheld body 102. For example, an adaptive sound cancellation processor is able to apply one or more adaptive sound cancellation algorithms to voice signals produced by the voice microphone 106 to reduce the ambient sounds contained in the voice signal based upon the ambient sound signal produced by the ambient sound microphone 104.

An example application for the ambient sound signal produced by the ambient sound microphone 104 is to detect echo sounds that are either echoes of a user's speech when talking into the voice microphone 106, or that are echoes of sounds emitted by the earpiece speaker 112 or by other speakers (not shown) emitting sound produced by the handheld device 100. Ambient sound signals representing echo sounds detected by an ambient sound microphone 104 are provided in one example to an adaptive sound cancellation processor to implement echo cancellation processing on the voice signal produced by the voice microphone 106. Echo cancellation processing is able to be applied when the handheld body 102 is held to a speaker's face or when the handheld device 100 is used as a speaker phone.

Another example application of ambient sound signals produced by the ambient sound microphone 104 is to detect ambient acoustic noise that is present in the environment in which the handheld device 100 is being used. Ambient acoustic noise detected by the ambient sound microphone 104 is used in one example by an adaptive sound cancellation processor to cancel similar ambient acoustic noise energy that is present in a voice signal produced by the voice microphone 106.

The illustrated example depicts an ambient sound microphone 104 that is located on a left side 122 of the handheld body 102. In further examples, an ambient sound microphone is able to be located on any surface of the handheld body 102, or is able to be located remotely. In yet further examples, multiple ambient sound microphones are able to be located at various locations around the handheld body 102.

Figure 2:
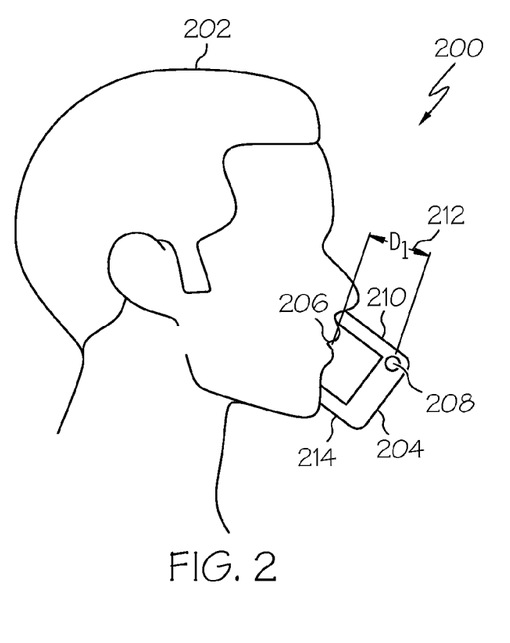
FIG. 2 illustrates a handheld device held to a left side of a speaker's face, according to one example.

FIG. 2 illustrates a handheld device held to a left side of a speaker's face 200, according to one example. The handheld device held to a left side of a speaker's face 200 depicts a side view of a right side of a speaker's head 202 with a handheld device 204 placed on the far, or left, side of the depicted speaker's head 202. In this example, the handheld device 204 is a cellular telephone handset and the depicted user is speaking into the handheld device 204 as part of carrying out a telephone call. In the illustrated example, and further referring to FIG. 1 discussed above, the handheld device 204 is similar to the above described handheld device 100 and has a form similar to the above described handheld body 102.

In operating as a cellular telephone handset, the handheld device 204 also produces audio that is delivered to the user's ear. Referring to the handheld body 102 and earpiece speaker 112 described above, the handheld device 204 has a similar earpiece speaker (not show in this figure) that is placed over the user's left ear (not shown) when in the position illustrated in the handheld device held to a left side of a speaker's face 200.

As shown in the handheld device held to a left side of a speaker's face 200, the user is able to be considered as a speaker, and the speaker's head 202 includes a speaker's face on which the handheld device 204 is held to one side or the other. It is clear from the illustrated perspective of the handheld device held to a left side of a speaker's face 200 that the handheld device 204 is on the left side of the speaker's face.

The handheld device 204 is shown to have a voice microphone 208. The voice microphone 208 is shown at a location that is close to a right edge 210 of the handheld device 204. As shown in a typical arrangement where the user is holding the handheld device 204 to the left side of his or her face, it is seen that the voice microphone 208 is located at a first distance $d_1$ 212 from the speaker's mouth 206. As is discussed above with regards to FIG. 1, the voice microphone is located to one side on the front of the handheld device 204. Because right handed people tend to hold a handset, such as the handheld device 204, to the left side of their face, the voice microphone 208 is placed so as to be closer to the speaker's mouth 206 when held to the left side of the speaker's face. In the design of this handheld device 204, the voice microphone is near the right edge 210, which is near the top of the handheld device 204 as it is positioned on the left side of the speaker's face.

The handheld device 204 in this example further has an ambient sound microphone (not shown) that is located on an upper part of a left side 214 of the handheld device 204. The ambient sound microphone on the left side 214 of the handheld device 204 is similar to the ambient sound microphone 104 located on the left side 122 of the handheld device 100 described above. As shown for the handheld device 100, the ambient sound microphone of the handheld device 204 is located near the top of the left side 214, near the speaker's ear. As depicted in the handheld device held to a left side of a speaker's face 200, the voice microphone 208 is relatively close to the speaker's mouth 206. It is also clear that an ambient sound microphone located on the upper part of the left side 214 is much farther from the speaker's mouth than the voice microphone 208, and is likely to pick-up a lower level of voice energy from the speaker's mouth 206.

Figure 3:
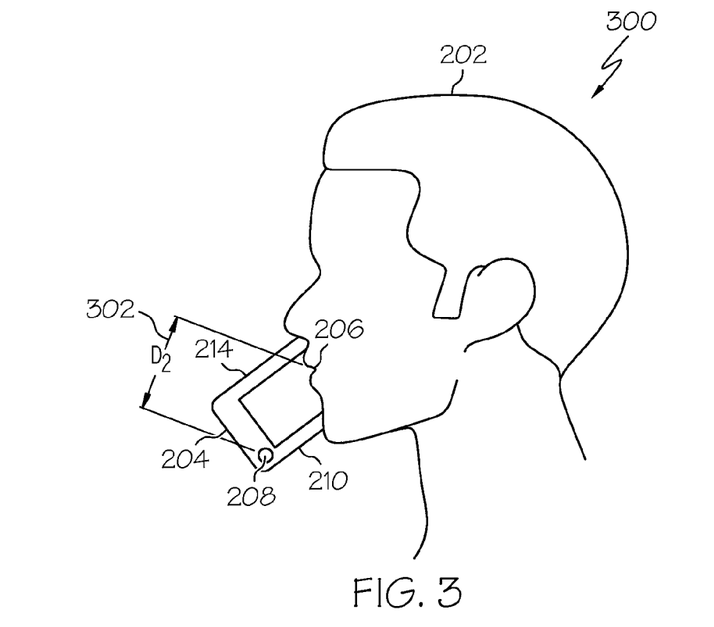
FIG. 3 illustrates a handheld device held to a right side of a speaker's face, according to an example.

FIG. 3 illustrates a handheld device held to a right side of a speaker's face 300, according to an example. The elements of the handheld device held to a right side of a speaker's face 300 are similar to the above described handheld device held to a left side of a speaker's face 200 except that the user is holding the handheld device 204 to the right side of his or her face. In this orientation, the voice microphone 208, along with the right edge 210 of the handheld device 204, is located near the bottom of the handheld device as it is positioned on the right side of the speaker's face.

As shown, when the handheld device 204 is held to the right side of the speaker's face, the voice microphone is located at a second distance $d_2$ 302 from the speaker's mouth 206. In this orientation, the second distance $d_2$ 302 is longer than the first distance $d_1$ 212. Due to the close proximity of a handheld device 204 to a speaker's mouth, an asymmetrically located voice microphone, such as voice microphone 208 that is located near an edge of a handheld body, the second distance $d_2$ is able to be many times the first distance $d_1$ 212. Because sound energy decreases with the square of distance, the sound energy reaching the voice microphone 208 when the handheld device 204 is held on the right side of the user face is able to be much lower than the sound energy reaching the voice microphone 208 when the handheld device 204 is held on the left side of the speaker's face.

For example, if $d_2$ is twice the distance of $d_1$, the sound energy from the speaker's mouth 206 when the handheld device 204 is held to the speaker's face right side is one fourth of the sound energy as when the handheld device 204 is held to the speaker's face left side. If $d_2$ is three time the distance of $d_1$, the sound energy from the speaker's mouth 206 when the handheld device 204 is held to the speaker's face right side is one ninth of the sound energy as when the handheld device 204 is held to the speaker's face left side. This reduction in sound energy of the speaker's voice as a function of which side of the speaker's face the handheld device is held causes a correspondingly large reduction in signal-to-noise ratio for the voice signal produced by the voice microphone 208.

As described above, the handheld device 204 has an ambient sound microphone (not shown in this figure) on the upper part of the left side 214. As depicted in the handheld device held to a right side of a speaker's face 300, the left side 214 is closer to the speaker's mouth 206 than in the handheld device held to a left side of a speaker's face 200. This arrangement is likely to increase the sound energy of the speaker's voice that the ambient sound microphone (not shown in this figure) on the left side 214 receives, thereby increasing the voice content in the ambient sound signal produced by the ambient sound microphone. The combination of a reduced voice signal-to-noise ratio in the voice signal produced by the voice microphone 208 along with the increased voice signal energy in the ambient sound signal produced by the ambient microphone when the handheld device 204 is held to the right side of the speaker's face is able to cause poor performance with adaptive sound cancellation algorithms that operate to reduce signals present in an ambient sound signal from the voice signal.

In some instances, a significant cancellation of the desired voice signal has been observed by these algorithms when operating under these conditions.

Several other factors also contribute to the degradation in adaptive sound cancellation algorithm performance when a handheld device 204, that has an asymmetrically located voice microphone, is held to one side of a speaker's face rather than another. For example, some adaptive sound cancelling algorithms are sensitive to low signal-to-noise ratios in the voice signal, i.e., the signal from which sound is to be adaptively cancelled. In one example, an adaptive noise cancelling algorithm with a particular set of parameters may be able to very effectively cancel ambient noise from voice signals with high voice signal-to-noise ratios. That adaptive noise cancelling algorithm with those parameters, however, may also operate to poorly isolate the voice content in a voice signal with a low signal-to-noise ratio and therefore operate to cancel most of the audio in the voice signal, including the desired voice content.

In order to improve the performance of adaptive audio cancellation processing applied to a voice signal that is produced by a voice microphone that is asymmetrically located on a handheld device, an audio processor in one example receives an orientation indication that indicates if the handheld device is expected to be one held to a left side of a speaker's face or to a right side of the speaker's face. In one example, the orientation indication is provided through a user interface facility, such as an input screen slider, check box, or the like, that allows a user of the handheld device to indicate if he or she is left handed or right handed. Based on the orientation indication, and assumptions regarding preferences of a left handed or right handed person in holding a handheld device, an adaptive audio processor selects or alters one or more adaptive sound cancelling algorithm configurations to more effectively operate with the expected voice signal-to-noise ratios that are produced by an asymmetrically located voice microphone when the handheld device is held to one side of the speaker's face or the other.

In this description, a particular sound cancellation algorithm configuration includes a particular processing algorithm and also the particular values of any parameters that are able to be adjusted for that particular algorithm. In one example, some algorithms are able to be configured with different parameter values to control the operation of the algorithm and thereby cause the algorithm to operate differently with different parameter values. In this description, two instances of a similar processing algorithm that are each configured with parameters having different values are considered to be different sound cancellation algorithm configurations.

An example design and operation of a system including an adaptive sound cancellation processor is described below. The following discussion describes an example user interface to control part of the operation of the adaptive sound cancellation processor and also depicts a circuit configuration for an example system. It is clear that the following example is not limiting and that other designs, configurations, and operational details are also able to effectively utilize the concepts described by the following example.

Figure 4:
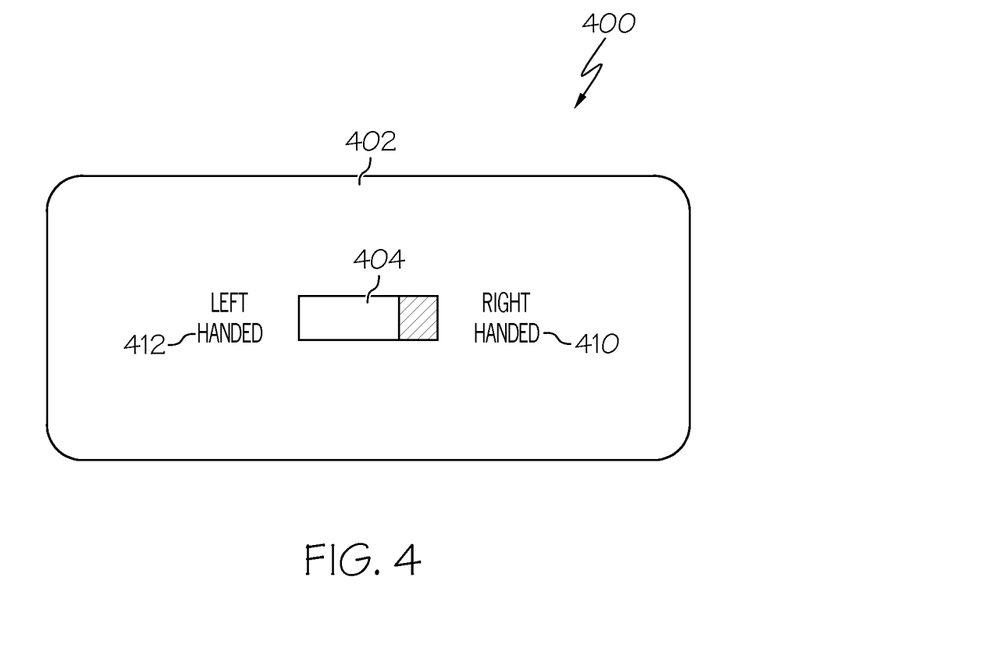
FIG. 4 illustrates a handedness user interface, according to one example.

FIG. 4 illustrates a handedness user interface 400, according to one example. The handedness user interface 400 depicts a graphical user interface 402 that is displayed, for example, on a touch screen of a handheld device. With reference to FIG. 1, the graphical user interface 402 is able to be displayed on the display screen 110. The handedness user interface 400 is an example of an orientation sensor that produces an orientation indication that indicates an expected position of a device. In one example, the orientation indication produced by the handedness user interface 400 is able to have two states. In one example, the first state indicates that the expected position of a handheld body is its being held to a left side of a speaker's face. In that example, the second state that indicates that the expected position of the handheld body is its being held to the right side of the speaker's face.

The graphical user interface 402 includes a slider switch 404 that is a graphical user interface element. The slider switch 404 is shown as selecting a right handed operation, whereby the displayed graphical user interface element includes a component, such as a filled block of the slider switch 404, that is closest to the "RIGHT HANDED" label 410. When the slider switch 404 is selecting the right handed operation, an orientation indication is provided to an adaptive sound cancellation processor that indicates that expected position of the handheld device the left side of the speaker's face. In one example, the adaptive sound cancellation processor selects adaptive sound cancellation algorithms that perform well under the expected voice signal-to-noise ratios contained in the voice signals produced by a voice microphone when the handheld device is held to the left side of the speaker's face.

The user is able to cause the slider switch 404 to move from selecting the right handed operation position (shown) to selecting a left handed operation position. In one example, a user is able to place his or her finger on the slider switch 404 and move that finger from the right to left, thereby causing the slider switch 404 to move to, so as to select, a left handed operation position (not shown). When selecting the left handed operation position, the graphical user interface element has a component, such as a filled block of the slider switch 404, that is closest to the "LEFT HANDED" label 412. When the slider switch 404 is selecting the left handed operation position, an orientation indication is provided to an adaptive sound cancellation processor indicating that the handheld device is expected to be on the right side of the speaker's face.

In one example, the adaptive sound cancellation processor selects adaptive sound cancellation algorithms that perform well under the expected voice signal-to-noise ratios contained in the voice signals produced by a voice microphone when the handheld device is held to the right side of the speaker's face. As is discussed above, an asymmetrically located voice microphone may be positioned on the front 120 of a handheld device 100 so as to operate more effectively when used by a right handed user, i.e., when the handheld device is held to the left side of the a speaker's face. When the handheld device 100 is held to the right side of the speaker's face, a lower voice signal-to-noise ratio is expected due to the voice microphone placement. In the above described example, different adaptive sound cancellation algorithm configurations are used based upon the selection of the slider switch 404 to more effectively accommodate these different voice signal-to-noise ratios.

In further examples, an indication of the expected position of the handheld device as being to a left side or a right side of a speaker's face is able to be provided by any suitable technique. For example, an electro-mechanical switch is able to be operated by a user in a manner similar to the above graphical user interface of the handedness user interface 400 to allow a user to select a left handed or right handed operation. An orientation sensor, such as an accelerometer or gyroscope based orientation sensor, is further able to be used in addition to or instead of the handedness user interface 400 to further detect if the handheld device is positioned in a manner that is likely to indicate that it is being held to the left side or the right side of the speaker's face.

Figure 5:
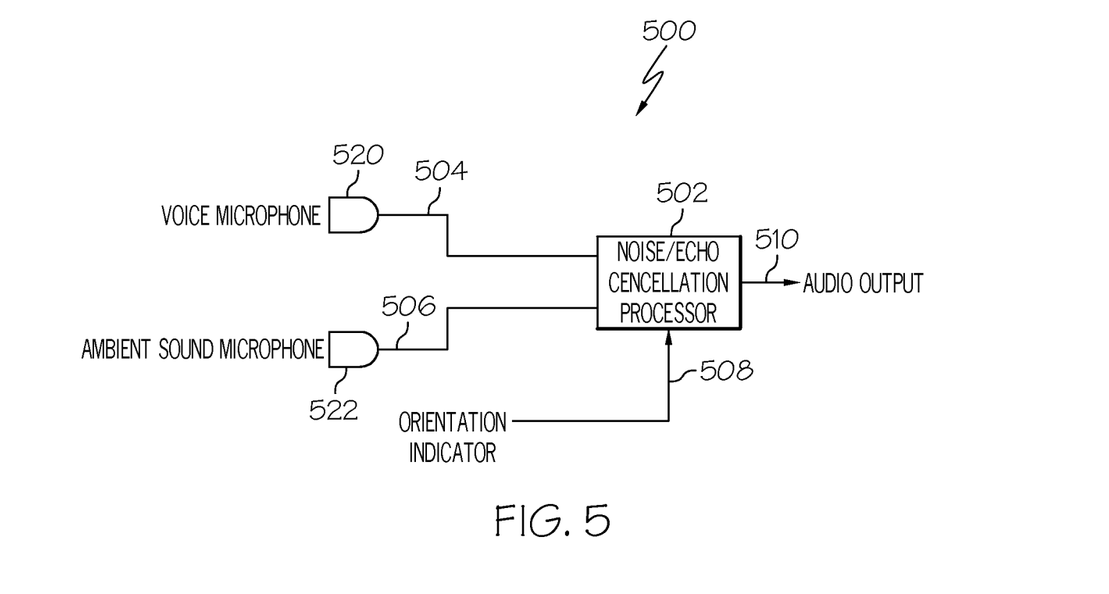
FIG. 5 illustrates an adaptive sound cancellation processor connection diagram, according to one example.

FIG. 5 illustrates an adaptive sound cancellation processor connection diagram 500, according to one example. The adaptive sound cancellation processor connection diagram 500 depicts a portion of an audio processor that is able to be included in the above described handheld device 100, handheld device 204, or in any handheld device to adaptively process an audio signal based on detected ambient sound energy.

The adaptive sound cancellation processor connection diagram 500 includes a noise/echo cancellation processor 502. The noise/echo cancellation processor 502 is an adaptive sound cancellation processor that performs adaptive filtering of a voice signal to reduce or remove detected ambient noise, echoes, or both.

The noise/echo cancellation processor 502 receives a voice signal 504 from a voice microphone 520. With reference to FIG. 1, the voice signal 504 in one example is produced by the depicted voice microphone 106. The noise/echo cancellation processor 502 further receives an ambient sound signal 506 that contains ambient sound information, such as ambient noise sound information or echo sound information, from an ambient sound microphone 522. With reference to the above described handheld device 100, the ambient sound signal 506 in one example is produced by an ambient sound microphone 104.

In various examples an electronic device that includes a noise/echo cancellation processor 502 is able to operate with multiple voice microphones, multiple ambient sound microphones, or both multiple voice microphones and multiple ambient sound microphones. In some examples, a particular microphone may be alternatively used as either a voice microphone or as an ambient sound microphone based upon, for example, the orientation of the electronic device relative to the person speaking. In some examples, multiple microphones are able to be connected as a microphone array where their output signals are added with appropriate phase delays to form a synthesized audio reception beam for the microphone array. Such microphone arrays are able to form a reception beam that is directed to a speaker's mouth or form a reception pattern with attenuated sensitivity in a particular direction, such as in a direction from which an acoustic noise source is received.

The noise/echo cancellation processor 502 further receives an orientation indication 508 that is able to have two states. The two states of the orientation indication 508 indicate, for example, if the user of the handheld device is left handed or right handed, and therefore whether the expected position of the handheld device is to a left side or a right side of the speaker's face. In a further example, the orientation indication 508 is determined by an orientation sensor, such as an accelerometer or gyroscope based orientation sensor, and indicates the current orientation of the handheld device relative to a horizontal reference, such as the ground. Two states of an orientation indication determined by an orientation sensor are able to be determined by, for example, a value of orientation relative to a threshold. The two states of the orientation indication 508 are able to be indicated by, for example, different voltage levels on a conductor, a data message sent over a data interface, or any other indication communications mechanism.

In one example, the noise/echo cancellation processor 502 is able to select from a number of adaptive sound cancellation algorithm configurations to apply to voice signals 504 to reduce or remove ambient noise based upon noise content detected in the ambient noise signal 506. The noise/echo cancellation processor 502 selects an adaptive sound cancellation algorithm configuration to use to adaptively cancel ambient sound from the voice signal 504 based upon the state of the orientation indication 508. An ambient sound cancelled audio output 510 is produced by the noise/echo cancellation processor 502 and is used in one example as an audio signal to be transmitted by a cellular telephone.

In the above example, the noise/echo cancellation processor 502 is able to implement a single selected processing algorithm to adaptively cancel ambient noise from the voice signal 504 when the orientation indication 508 is in either state but different parameter values are used for the processing algorithm based upon the state of the orientation indication 508. For example, a first set of parameter values for the selected processing algorithm is used when the orientation indication 508 is in a first state, and a second set of parameter values for the selected processing algorithm is used when the orientation indication 508 is in a second state. The values of the first set of parameters in one example are defined to cause the selected algorithm to more effectively process voice signals that have a low signal-to-noise ratio. The values of the second set of parameters are then defined to cause the selected algorithm to more effectively process voice signals that have higher signal-to-noise ratios.

Figure 6:
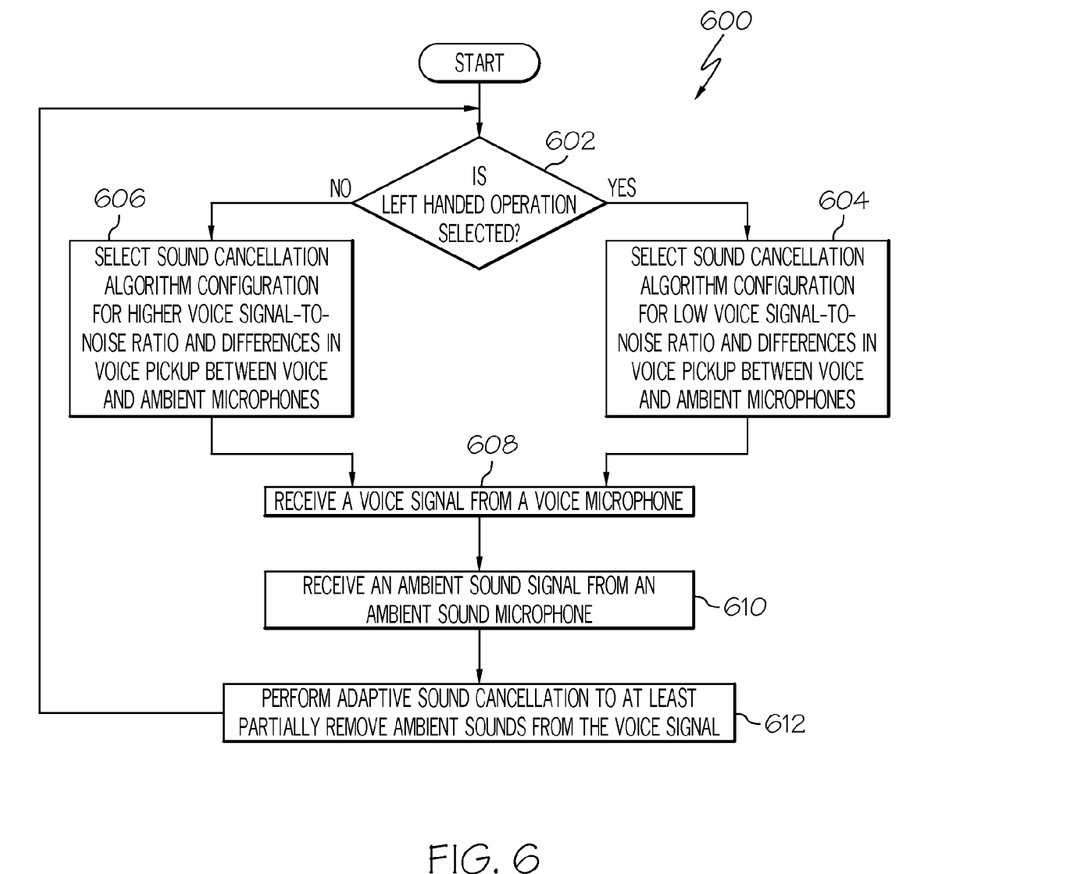
FIG. 6 illustrates an adaptive sound cancellation process, according to one example.

FIG. 6 illustrates an adaptive sound cancellation process 600, according to one example. The adaptive sound cancellation process 600 is an example of a method of processing audio signals that is performed in one example by a noise/echo cancellation processor 502 described above. In further examples, all or parts of the adaptive sound cancellation process 600 is able to be performed by an audio processor or by a general purpose processor that is controlling an audio processor that is performing adaptive sound cancellation processing. For example, a general purpose processor is able to adjust or reconfigure parameters that control an adaptive sound cancellation algorithm executed by a separate audio processor.

The adaptive sound cancellation process 600 begins by determining, at 602, whether a device is selected for left handed operation. In one example, a user is able to indicate via a user interface whether the user is right handed or left handed. In that example, a determination that the device is selected for left handed operation is based on input received through that user interface. In further examples, the determination of whether a device is selected for left handed operation is based upon an output of an orientation sensor, such as an accelerometer or gyroscope based orientation sensor, that determines the orientation of a device with respect to the ground.

If it is determined that the device is selected for left handed operation, the adaptive sound cancellation process 600 selects, at 604, a first sound cancellation algorithm configuration selected to process voice signals. In one example, the first sound cancellation algorithm configuration is defined to effectively process voice signals with a low voice signal-to-noise ratio. The first sound cancellation algorithm configuration is also defined to accommodate differences in voice pick-up between a voice microphone and an ambient sound microphone when the handheld device is held to a right side of the speaker's face.

If it is not determined that the device is selected for left handed operation, the adaptive sound cancellation process 600 selects, at 606, a second sound cancellation algorithm configuration. In one example, the second sound cancellation algorithm configuration is defined to effectively process voice signals with a higher voice signal-to-noise ratio. The second sound cancellation algorithm configuration is also defined to accommodate differences in voice pick-up between a voice microphone and an ambient sound microphone when the handheld device is held to a left side of the speaker's face.

After selecting either a first sound cancellation algorithm configuration or a second sound cancellation algorithm, the adaptive sound cancellation process 600 receives, at 608, a voice signal from a voice microphone. The adaptive sound cancellation process 600 further receives, at 610, an ambient sound signal from an ambient sound microphone. The adaptive sound cancellation process 600 proceeds to perform, at 612, adaptive sound cancellation processing to at least partially remove ambient sounds from the voice signal. The adaptive sound cancellation process 600 then returns to determine, at 602, whether a device is selected for left handed operation.

Figure 7:
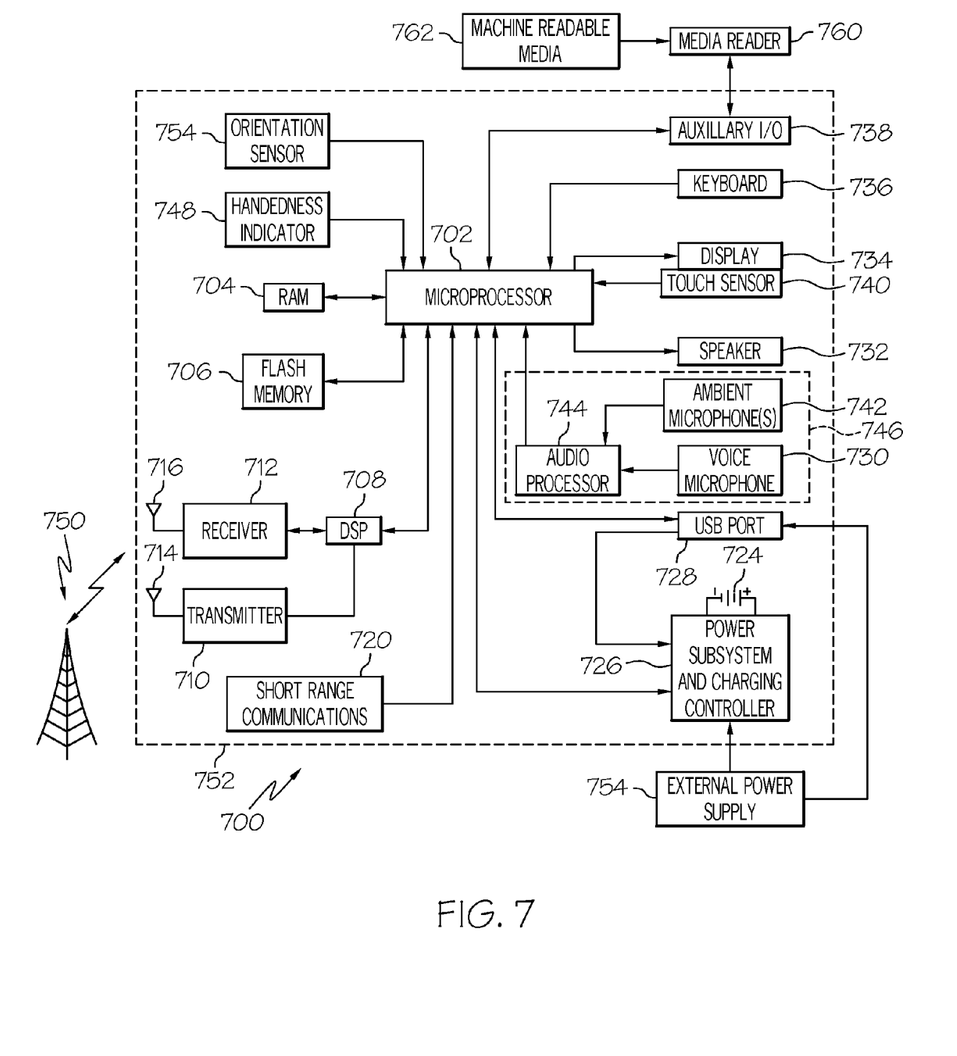
FIG. 7 is a block diagram of an electronic device and associated components.

FIG. 7 is a block diagram of an electronic device and associated components 700 that is able to include the above described systems and perform the above described methods. In this example, an electronic device 752 is a wireless two-way communication device with voice and data communication capabilities. Such electronic devices communicate with a wireless network 750, which is able to include a wireless voice network, a wireless data network, or both, that use one or more wireless communications protocols. Wireless communications are performed using either an analog or digital wireless communication channel. Data communications allow the electronic device 752 to communicate with other computer systems via the Internet. Examples of electronic devices that are able to incorporate the above described systems and methods include, for example, a data messaging device, a two-way pager, a cellular telephone with data messaging capabilities, a wireless Internet appliance or a data communication device that may or may not include telephony capabilities.

The illustrated electronic device 752 is an example electronic device that includes two-way wireless communications functions. Such electronic devices incorporate a wireless communication component that includes a wireless communications subsystem including elements such as a wireless transmitter 710, a wireless receiver 712, and associated components such as one or more antenna elements 714 and 716. A digital signal processor (DSP) 708 performs processing to extract data from received wireless signals and to generate signals to be transmitted. The particular design of the communication subsystem is dependent upon the wireless communications network and associated wireless communications protocols with which the device is intended to operate.

The electronic device 752 includes a microprocessor 702 that controls the overall operation of the electronic device 752. The microprocessor 702 interacts with the above described communications subsystem elements and also interacts with other device subsystems such as flash memory 706, random access memory (RAM) 704, auxiliary input/output (I/O) device 738, USB Port 728, display 734, touch sensor 740, keyboard 736, speaker 732, audio processor 744, a short-range communications subsystem 720, an orientation sensor 754, a handedness indicator 748, a power subsystem and charging controller 726, and any other device subsystems.

The handedness indicator 748 provides an orientation indication to the microprocessor 702 that represents whether the electronic device 752 is expected to be positioned on a left side or a right side of a user's face based upon whether the user is left handed or right handed. The handedness user interface 400 is an example of a user interface of a handedness indicator 748. In the example of the handedness user interface 400, a user provides an input that indicates whether he or she is left handed or right handed. The indication provided by the handedness indicator 748 is received, in one example, by an orientation input in the microprocessor 702 and is used to select which sound cancellation algorithm configuration is to be applied in adaptive sound cancellation processing.

The electronic device 752 in one example further includes an orientation sensor 754. Various electronic devices are able to incorporate one or more orientation sensors that include, for example, accelerometer or gyroscope based orientation sensors, light sensors that are located at locations on a case of the electronic device such that the light sensors are exposed or covered based upon a position or location of a user's hand when holding the electronic device 752 to either the right side or left side of the user's face, or any other type of apparatus that is able to provide an indication of the orientation of the electronic device 752 or the side of the user's face to which the electronic device 752 is expected to be held. In some examples, the orientation sensor produces an indication of the current orientation of the electronic device relative to the ground. As described above, an expected position of the handheld device is indicted by the current orientation of the electronic device 752 relative to a horizontal reference such as the ground. In various examples, the orientation sensor 754 is able to be used in place of or in conjunction with the handedness indicator 748.

The electronic device 752 in one example includes an audio subsystem 746 that includes an audio processor 744, a voice microphone 730 and at least one ambient microphone (s) 742. As discussed above, an audio processor 744 in one example receives a voice signal representing a user's voice and some ambient sounds that are detected by the voice microphone 730 and an ambient sound signal representing ambient sounds detected by the ambient microphone 742, and performs processing to partially cancel or reduce ambient sound content from the voice signal. As is also described above, the audio processor 744 is able to receive an orientation indication that indicates an expected position in which the electronic device 752 is held, such as on a right side or a left side of a speaker's face. In one example, the microprocessor 702 provides the orientation indication based upon a signal received from one or both of the handedness indicator 748 or the orientation sensor 754.

The display 734 in one example is able to be a touch screen display such as is discussed above. In this example, the display 734 has an attached touch sensor 740. In the case of a touch screen display, the display 734 and the touch sensor 740 provide user input information to microprocessor 702 in addition to presenting information provided by microprocessor 702. In the case of a touch screen display 734 with touch sensor 740, the keyboard 736 may not be included in the electronic device 752 or the keyboard 736 may include a reduced number of keys.

A power pack 724 is connected to a power subsystem and charging controller 726. The power pack 724 provides power to the circuits of the electronic device 752. The power subsystem and charging controller 726 includes power distribution circuitry for providing power to the electronic device 752 and also contains power pack charging controller circuitry to manage recharging the power pack 724.

The USB port 728 provides data communication between the electronic device 752 and one or more external devices. Data communication through USB port 728 enables a user to set preferences through the external device or through a software application and extends the capabilities of the device by enabling information or software exchange through direct connections between the electronic device 752 and external data sources rather than through a wireless data communication network.

Operating system software used by the microprocessor 702 is stored in flash memory 706. Further examples are able to use a power pack backed-up RAM or other non-volatile storage data elements to store operating systems, other executable programs, or both. The operating system software, device application software, or parts thereof, are able to be temporarily loaded into volatile data storage such as RAM 704. Data received via wireless communication signals or through wired communications are also able to be stored to RAM 704.

The microprocessor 702, in addition to its operating system functions, is able to execute software applications on the electronic device 752. A predetermined set of applications that control basic device operations, including at least data and voice communication applications, is able to be installed on the electronic device 752 during manufacture. Examples of applications that are able to be loaded onto the device may be a personal information manager (PIM) application having the ability to organize and manage data items relating to the device user, such as, but not limited to, e-mail, calendar events, voice mails, appointments, and task items.

Further applications may also be loaded onto the electronic device 752 through, for example, the wireless network 750, an auxiliary I/O device 738, USB port 728, short-range communications subsystem 720, or any combination of these interfaces. Such applications are then able to be installed by a user in the RAM 704 or a non-volatile store for execution by the microprocessor 702.

In a data communication mode, a received signal such as a text message or web page download is processed by the communication subsystem, including wireless receiver 712 and wireless transmitter 710, and communicated data is provided the microprocessor 702, which is able to further process the received data for output to the display 734, or alternatively, to an auxiliary I/O device 738 or the USB port 728. A user of the electronic device 752 may also compose data items, such as e-mail messages, using the keyboard 736, which is able to include a complete alphanumeric keyboard or a telephone-type keypad, in conjunction with the display 734 and possibly an auxiliary I/O device 738. Such composed items are then able to be transmitted over a communication network through the communication subsystem.

For voice communications, overall operation of the electronic device 752 is substantially similar, except that received signals are generally provided to a speaker 732 and signals for transmission are generally produced by a microphone, such as voice microphone 730. In some examples, an audio processor 744 is able to produce a voice signal detected by a voice microphone 730 but with ambient sound detected by the ambient microphone 742 partially cancelled. Alternative voice or audio I/O subsystems, such as a voice message recording subsystem, may also be implemented on the electronic device 752. Although voice or audio signal output is generally accomplished primarily through the speaker 732, the display 734 may also be used to provide an indication of the identity of a calling party, the duration of a voice call, or other voice call related information, for example.

Depending on conditions or statuses of the electronic device 752, one or more particular functions associated with a subsystem circuit may be disabled, or an entire subsystem circuit may be disabled. For example, if the power pack temperature is high, then voice functions may be disabled, but data communications, such as e-mail, may still be enabled over the communication subsystem.

A short-range communications subsystem 720 is a further optional component which may provide for communication between the electronic device 752 and different systems or devices, which need not necessarily be similar devices. For example, the short-range communications subsystem 720 may include an infrared device and associated circuits and components or a Radio Frequency based communication module such as one supporting Bluetooth® communications, to provide for communication with similarly-enabled systems and devices.

A media reader 760 is able to be connected to an auxiliary I/O device 738 to allow, for example, loading computer readable program code of a computer program product into the electronic device 752 for storage into flash memory 706. One example of a media reader 760 is an optical drive such as a CD/DVD drive, which may be used to store data to and read data from a computer readable medium or storage product such as computer readable storage media 762. Examples of suitable computer readable storage media include optical storage media such as a CD or DVD, magnetic media, or any other suitable data storage device. Media reader 760 is alternatively able to be connected to the electronic device through the USB port 728 or computer readable program code is alternatively able to be provided to the electronic device 752 through the wireless network 750.

Information Processing System

The present subject matter can be realized in hardware, software, or a combination of hardware and software. A system can be realized in a centralized fashion in one computer system, or in a distributed fashion where different elements are spread across several interconnected computer systems. Any kind of computer system—or other apparatus adapted for carrying out the methods described herein—is suitable. A typical combination of hardware and software could be a general purpose computer system with a computer program that, when being loaded and executed, controls the computer system such that it carries out the methods described herein.

The present subject matter can also be embedded in a computer program product, which comprises all the features enabling the implementation of the methods described herein, and which—when loaded in a computer system—is able to carry out these methods. Computer program in the present context means any expression, in any language, code or notation, of a set of instructions intended to cause a system having an information processing capability to perform a particular function either directly or after either or both of the following a) conversion to another language, code or, notation; and b) reproduction in a different material form.

Each computer system may include, inter alia, one or more computers and at least a computer readable medium allowing a computer to read data, instructions, messages or message packets, and other computer readable information from the computer readable medium. The computer readable medium may include computer readable storage medium embodying non-volatile memory, such as read-only memory (ROM), flash memory, disk drive memory, CD-ROM, and other permanent storage. Additionally, a computer medium may include volatile storage such as RAM, buffers, cache memory, and network circuits. Furthermore, the computer readable medium may comprise computer readable information in a transitory state medium such as a network link and/or a network interface, including a wired network or a wireless network, that allow a computer to read such computer readable information.

Non-Limiting Examples

Although specific embodiments of the subject matter have been disclosed, those having ordinary skill in the art will understand that changes can be made to the specific embodiments without departing from the spirit and scope of the disclosed subject matter. The scope of the disclosure is not to be restricted, therefore, to the specific embodiments, and it is intended that the appended claims cover any and all such applications, modifications, and embodiments within the scope of the present disclosure.

What is claimed is:

1. An audio processing device, comprising:
  a handheld body configured to be selectively held to either one of a first side of a speaker's face and a second side of the speaker's face;
  an ambient sound microphone positioned on the handheld body to detect ambient sound and configured to produce an ambient sound signal based upon detected ambient sound;
  a voice microphone positioned asymmetrically on the handheld body relative to a centerline of the handheld body as the handheld body is held to the speaker's face, the voice microphone being located at a farther distance from a speaker's mouth when the handheld body is held to the first side of the speaker's face than when held to the second side of the speaker's face, the voice microphone configured to produce a voice signal; and
  an adaptive sound cancellation processor, communicatively coupled to the ambient sound microphone and the voice microphone, the adaptive sound cancellation processor configured to:
  receive an orientation indication indicating that an expected orientation of the handheld body is being held to one of the first side of the speaker's face and the second side of the speaker's face; and
  adaptively reduce ambient sound, corresponding to the ambient sound signal, from the voice signal by applying a variable sound cancellation algorithm,
    the variable sound cancellation algorithm applying, based on the orientation indication indicating that the expected orientation is the first side of the speaker's face, a first sound cancellation algorithm configuration for the variable sound cancellation algorithm that is selected to process voice signals with first signal-to-noise ratio, and
    the sound cancellation algorithm applying, based on the orientation indication indicating that the expected orientation is the second side of the speaker's face, a second sound cancellation algorithm configuration for the variable sound cancellation algorithm that is selected to process voice signals with a second signal-to-noise ratio, where the first signal-to-noise ratio is lower than the second signal-to-noise ratio.

2. The audio processing device of claim 1, wherein the orientation indication comprises an indication of an orientation of the handheld body relative to a horizontal reference.

3. The audio processing device of claim 1, wherein the first sound cancellation algorithm configuration adaptively performs less ambient sound reduction than the second sound cancellation algorithm configuration.

4. The audio processing device of claim 1, wherein the ambient sound signal comprises ambient noise sound information and wherein the first sound cancellation algorithm configuration and the second sound cancellation algorithm configuration comprise respective different noise cancelling algorithms.

5. The audio processing device of claim 1, wherein the first sound cancellation algorithm configuration differs from the second sound cancellation algorithm configuration by at least anticipating the farther distance.

6. The audio processing device of claim 1, wherein the first sound cancellation algorithm configuration comprises a selected processing algorithm operating with a first set of parameters, and wherein the second sound cancellation algorithm configuration comprises the selected processing algorithm operating with a second set of parameters, the second set of parameters being different than the first set of parameters.

7. The audio processing device of claim 1, wherein the ambient sound signal comprises echo sound information and wherein the first sound cancellation algorithm configuration and the second sound cancellation algorithm configuration comprise respective different echo cancelling algorithms.

8. The audio processing device of claim 7, wherein the first sound cancellation algorithm configuration comprises a first echo cancelling algorithm configuration, and the second sound cancellation algorithm configuration comprises a second echo cancelling algorithm configuration that differs from the first echo cancelling algorithm configuration by anticipating the farther distance.

9. A method for processing audio signals, the method comprising:
receiving an orientation indication having a first state indicating that an expected orientation of a handheld body is a first side of a speaker's face and having a second state indicating that the expected orientation of the handheld body is a second side of a speaker's face, the second side of a speaker's face being different from the first side of a speaker's face;
receiving an ambient sound signal based upon detected ambient sound;
receiving a voice signal with a voice microphone positioned asymmetrically on the handheld body relative to a centerline of the handheld body as the handheld body is held to the speaker's face such that the voice microphone is located at a farther distance from a speaker's mouth when the handheld body is held to the first side of the speaker's face than when held to the second side of the speaker's face; and
adaptively reducing ambient sound, corresponding to the ambient sound signal, from the voice signal by applying a variable sound cancellation algorithm,
the variable sound cancellation algorithm applying, based on the orientation indication having the first state, a first sound cancellation algorithm configuration for the variable sound cancellation algorithm that is selected to process voice signals with first signal-to-noise ratio, and
the variable sound cancellation algorithm applying, based on the orientation indication having the second state, a second sound cancellation algorithm configuration for the variable sound cancellation algorithm that is selected to process voice signals with a second signal-to-noise ratio, where the first signal-to-noise ratio is lower than the second signal-to-noise ratio.

10. The method of claim 9, wherein receiving the orientation indication comprises receiving an indication of an orientation of the handheld body relative to a horizontal reference.

11. The method of claim 9, wherein the first sound cancellation algorithm configuration adaptively performs less ambient sound reduction than the second sound cancellation algorithm configuration.

12. The method of claim 9, wherein the ambient sound signal comprises ambient noise sound information and wherein the first sound cancellation algorithm configuration and the second sound cancellation algorithm configuration comprise respective different noise cancelling algorithms.

13. The method of claim 9, wherein the first sound cancellation algorithm configuration differs from the second sound cancellation algorithm configuration by at least anticipating the farther distance.

14. The method of claim 9, wherein the first sound cancellation algorithm configuration comprises a selected processing algorithm operating with a first set of parameters, and wherein the second sound cancellation algorithm configuration comprises the selected processing algorithm operating with a second set of parameters, the second set of parameters being different than the first set of parameters.

15. The method of claim 9, wherein the ambient sound signal comprises echo sound information and wherein the first sound cancellation algorithm configuration and the second sound cancellation algorithm configuration comprise respective different echo cancelling algorithms.

16. The method of claim 15, wherein the first sound cancellation algorithm configuration comprises a first echo cancelling algorithm configuration, and the second sound cancellation algorithm configuration comprises a second echo cancelling algorithm configuration that differs from the first echo cancelling algorithm configuration by anticipating the farther distance.

17. A computer program product for processing audio signals, the computer program product comprising:
a non-transient computer readable storage medium having computer readable program code embodied therewith, the computer readable program code comprising instructions for:
receiving an orientation indication having a first state indicating that an expected orientation of a handheld body is a first side of a speaker's face and having a second state indicating that the expected orientation of the handheld body is a second side of a speaker's face, the second side of a speaker's face being different from the first side of a speaker's face;
receiving an ambient sound signal based upon detected ambient sound;
receiving a voice signal with a voice microphone positioned asymmetrically on the handheld body relative to a centerline of the handheld body as the handheld body is held to the speaker's face such that the voice microphone is located at a farther distance from a speaker's mouth when the handheld body is held to the first side of the speaker's face than when held to the second side of the speaker's face; and
adaptively reducing ambient sound, corresponding to the ambient sound signal, from the voice signal by applying a variable sound cancellation algorithm,
the variable sound cancellation algorithm applying, based on the orientation indication having the first state, a first sound cancellation algorithm configuration for the variable sound cancellation algorithm that is selected to process voice signals with first signal-to-noise ratio, and
the sound cancellation algorithm applying, based on the orientation indication having the second state, a second sound cancellation algorithm configuration for the variable sound cancellation algorithm that is selected to process voice signals with a second signal-to-noise ratio, where the first signal-to-noise ratio is lower than the second signal-to-noise ratio.

18. The computer program product of claim 17, wherein the first sound cancellation algorithm configuration adaptively performs less ambient sound reduction than the second sound cancellation algorithm configuration.

19. The computer program product of claim 17, wherein the ambient sound signal comprises ambient noise sound information and wherein the first sound cancellation algorithm configuration and the second sound cancellation algorithm configuration comprise respective different noise cancelling algorithms.

20. The computer program product of claim 17, wherein the first sound cancellation algorithm configuration differs from the second sound cancellation algorithm configuration by at least anticipating the farther distance.

21. The computer program product of claim 17, wherein the first sound cancellation algorithm configuration comprises a selected processing algorithm operating with a first set of parameters, and wherein the second sound cancellation algorithm configuration comprises the selected processing algorithm operating with a second set of parameters, the second set of parameters being different than the first set of parameters.

22. The computer program product of claim 17, wherein the ambient sound signal comprises echo sound information and wherein the first sound cancellation algorithm configuration and the second sound cancellation algorithm configuration comprise respective different echo cancelling algorithms.

23. The computer program product of claim 22, wherein the first sound cancellation algorithm configuration comprises a first echo cancelling algorithm configuration, and the second sound cancellation algorithm configuration comprises a second echo cancelling algorithm configuration that differs from the first echo cancelling algorithm configuration by anticipating the farther distance.

24. A wireless communications device, comprising:
    a handheld body configured to be selectively held to either one of a first side of a speaker's face and a second side of a speaker's face;
    a processor contained within the handheld body;
    a memory, communicatively coupled to the processor, configured to store information operated upon by the processor;
    a wireless communications component contained within the handheld body, the wireless communications component configured to provide wireless communications between the processor and a wireless network;
    an ambient sound microphone positioned on the handheld body to detect ambient sound and configured to produce an ambient sound signal based upon detected ambient sound;
    a voice microphone positioned asymmetrically on the handheld body relative to a centerline of the handheld body as the handheld body is held to the speaker's face, the voice microphone being located at a farther distance from a speaker's mouth when the handheld body is held to the first side of the speaker's face than when held to the second side of the speaker's face, the voice microphone configured to produce a voice signal; and
    an adaptive sound cancellation processor, communicatively coupled to the ambient sound microphone and the voice microphone, the adaptive sound cancellation processor configured to:
    receive an orientation indication indicating that an expected orientation of the handheld body is being held to one of the first side of the speaker's face and the second side of the speaker's face; and
    adaptively reduce ambient sound, corresponding to the ambient sound signal, from the voice signal by applying a variable sound cancellation algorithm,
        the variable sound cancellation algorithm applying, based on the orientation indication indicating that the expected orientation is the first side of the speaker's face, a first sound cancellation algorithm configuration for the variable sound cancellation algorithm that is selected to process voice signals with first signal-to-noise ratio, and applying, and
        based on the orientation indication indicating that the expected orientation is the second side of the speaker's face, a second sound cancellation algorithm configuration for the variable sound cancellation algorithm that is selected to process voice signals with a second signal-to-noise ratio, where the first signal-to-noise ratio is lower than the second signal-to-noise ratio.

25. The wireless communications device of claim 24, further comprising an orientation sensor configured to produce an indication of an orientation of the handheld body relative to a horizontal reference, wherein the orientation indication comprises the indication of an orientation of the handheld body relative to the horizontal reference.

\* \* \* \* \*